UNITED STATES PATENT OFFICE.

WILLIAM DODGE HORNE, OF YONKERS, NEW YORK.

PROCESS OF TREATING SUGAR OR OTHER SOLUTIONS.

SPECIFICATION forming part of Letters Patent No. 579,754, dated March 30, 1897.

Application filed March 14, 1896. Serial No. 583,248. (No specimens.)

*To all whom it may concern:*

Be it known that I, WILLIAM DODGE HORNE, residing at Yonkers, county of Westchester, and State of New York, have invented certain new and useful Improvements in Processes of Treating Sugar or other Solutions, of which the following is a specification.

My invention relates to a process of treating sugar and other solutions whereby the impurities contained therein are removed.

Generally my improved process consists in subjecting the solutions from which the impurities are to be removed to the action of chemicals, which latter, entering into combination in the solution, form an insoluble precipitate, which acts in the nature of a filtering agent and mechanically tends to separate the impurities.

My improved process further consists in subjecting solutions containing mineral bases, as, for instance, sugar solutions, subsequent to defecation, filtration, &c., to the action of chemicals, whereby the principal mineral bases are precipitated as insoluble compounds.

I will now describe my improved process as employed by me in the treatment of sugar solutions.

The sugar solutions to be purified may be of any desired degree of density, not exceeding that, however, commonly used in practice—*i. e.*, 1.415 specific gravity. To this solution I add, in the form of a solution or paste, an acid phosphate of lime, made by treating with sulfuric acid any suitable phosphatic material, such, for instance, as boneblack, phosphatic rock, bones, &c. Subsequently I add a quantity of an alkaline-earth base having a greater atomic weight than that of the base of the acid phosphate employed, such, for instance, as barium or strontium, oxid, or hydroxid in the form of a powder or of a solution or supersaturated solution in water. This latter chemical—*i. e.*, barium or strontium—combines with the first-named chemical—*i. e.*, acid phosphate of lime—to form an insoluble precipitate which contains all the phosphoric acid of the acid phosphate in the form of a tribasic phosphate. Any free sulfuric acid or any sulfate of lime in solution is also precipitated as an insoluble substance or substances.

The chemical reactions above noted are indicated by the accompanying formula:

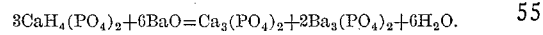

$$3CaH_4(PO_4)_2 + 6BaO = Ca_3(PO_4)_2 + 2Ba_3(PO_4)_2 + 6H_2O.$$

The amount of acid phosphate and alkaline salt employed will depend upon well-known conditions—*i. e.*, the amount of the "dry substance" in the sugar solution under treatment. In the treatment of solutions other than sugar the amount of the chemicals to be used can readily be determined by experiment.

The insoluble precipitate above mentioned acts to mechanically carry down with it or attract to it all of the suspended impurities in the solution treated, and the resultant solution, after bag filtration, is a clear solution, much lighter in color than where the usual phosphate-lime process is employed. The solution is free from the soluble salts—*i. e.*, salts of lime—found in the solutions treated by the old process above mentioned.

The process so far as described is advantageous over the old phosphate-lime process in that the salts of barium or strontium employed have a greater specific gravity than is the case with lime salts, and hence their precipitation is more rapid, thereby increasing the rapidity of the treatment of the solution, which is a point of practical advantage.

A further advantage is found in that the mechanical defecation is unaccompanied by the introduction of impurities, as in the old process. The resultant solution is lighter in color and there is a considerable reduction in the amount of molasses made.

Subsequent to the treatment above described, and after the sugar or other solution has been subjected to the usual treatment by filtration, boiling, &c., I introduce into the solution a phosphate of a non-volatile alkali, such as hydrogen-disodium phosphate, ($Na_2HPO_4$,) or I may use monosodic ($NaH_2PO_4$) or trisodic phosphate ($Na_3PO_4$) in the form of a solution and in sufficient quantity—*i. e.*, from .25 per cent. to two per cent. or more of the weight of dry substance contained in the solution—to precipitate the mineral bases, such as iron, lime, aluminium, magnesium, and any barium or strontium contained in said solutions.

The chemical reactions are approximately indicated by the following formula:

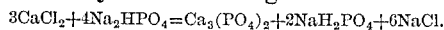
$3CaCl_2 + 4Na_2HPO_4 = Ca_3(PO_4)_2 + 2NaH_2PO_4 + 6NaCl.$

My process is finally completed by filtering the solution.

The step in the process last described may be employed independently of the first step in the process set forth—that is to say, I may use this last-described step or process for the treatment of sugar or other solutions generally after said solutions have been subjected to any suitable process of defecation, purification, and the usual subsequent treatment in the art; and I find such step to be especially useful in the treatment of all low-grade solutions obtained either as syrups from first or subsequent product crystals or as sweet waters from bag-washings or char, diluted or concentrated. The second step in the process above set forth serves to remove most of the mineral bases, and thereby improves the color and flavor of the final solution or syrups.

A further advantage of my improved process, considered as regards either of the steps mentioned or collectively, is that the crystallizability of the solution is improved, bloom is assured to yellow sugars, and cloud is prevented from forming in residual syrups. The coefficient of purity is raised, and scaling of pipes and coils in the apparatus employed in the treatment of the solution is prevented.

I wish it understood that I do not limit my improved process to the treatment of sugar liquors, as it may be used for the defecation and purification of water, oils, spirits, or any solution containing mechanically-suspended impurities, as well as for the separation by precipitation as insoluble phosphates any basic bodies forming such insoluble phosphates, where the introduction of the soluble side products of the reaction will not prove detrimental.

I am aware that a phosphate of a non-volatile alkali, such as the phosphate of soda or lime, has heretofore been used for treating solutions of raw sugar or boiled solutions, and prior to crystallization. Such, however, I do not claim as my invention, which is limited, so far as the employment of a phosphate of a non-volatile alkali is concerned, to the employment of this material in connection with residual solutions.

Having thus described my invention, I claim—

1. The herein-described process of defecating and purifying sugar and other solutions, which consists in subjecting said solutions to the action of an acid phosphate of a base; subsequently to the action of an alkaline-earth base having a greater atomic weight than that of the base of the acid phosphate, whereby there is formed an insoluble precipitate, and finally removing the mechanically-suspended particles from said solution.

2. The herein-described process of defecating and purifying sugar and other solutions, which consists in subjecting said solutions to the action of an acid phosphate of a base of less atomic weight than barium or strontium; subsequently to the action of barium or strontium, oxid, or hydroxid, whereby there is formed an insoluble precipitate; and finally removing the mechanically-suspended particles from said solution.

3. The herein-described process of defecating and purifying sugar and other solutions, which consists in subjecting said solutions to the action of an acid phosphate of a base, then to the action of an alkaline-earth base, having a greater atomic weight than the base of the acid phosphate, and, finally, after filtration, &c., to the action of a phosphate of a non-volatile alkali.

4. The herein-described process of defecating and purifying sugar and other solutions, which consists in subjecting said solutions to the action of an acid phosphate of a base of less atomic weight than barium or strontium; subsequently to the action of barium or strontium, oxid or hydroxid, whereby there is formed an insoluble precipitate; and, finally, after filtration, &c., to the action of hydrogen-disodium phosphate.

5. The process of sugar-refining, which consists in subjecting the solution or solutions to defecation, filtration, purification, and the usual treatment subsequent thereto in the art, and then for the purpose of separating the mineral bases from said solutions, to the action of a phosphate of a non-volatile alkali.

In testimony whereof I affix my signature in the presence of two witnesses.

WILLIAM DODGE HORNE.

Witnesses:
GEORGE H. BENJAMIN,
PAUL N. TURNER.